United States Patent [19]

Bandai

[11] Patent Number: 5,001,470
[45] Date of Patent: Mar. 19, 1991

[54] THREE-DIMENSIONAL DISPLAY APPARATUS

[75] Inventor: Yoshiaki Bandai, Fuchu, Japan

[73] Assignee: Kabushiki Kaisha Toshiba, Kawasaki, Japan

[21] Appl. No.: 187,848

[22] Filed: Apr. 29, 1988

[30] Foreign Application Priority Data

Apr. 30, 1987 [JP] Japan .................. 62-106806

[51] Int. Cl.$^5$ .................................... G09G 1/02
[52] U.S. Cl. ..................... 340/729; 364/522
[58] Field of Search ........... 340/747, 748, 712, 729; 364/522

[56] References Cited

U.S. PATENT DOCUMENTS

| | | | |
|---|---|---|---|
| 3,889,107 | 6/1975 | Sutherland | 340/747 |
| 4,475,104 | 10/1984 | Shen | 340/729 |
| 4,658,247 | 4/1987 | Gharachorloo | 340/747 |
| 4,677,576 | 6/1987 | Berlin, Jr. et al. | 364/522 |
| 4,730,261 | 3/1988 | Smith | 340/729 |
| 4,737,921 | 4/1988 | Goldwasser et al. | 364/522 |
| 4,812,988 | 3/1989 | Duthuit et al. | 364/522 |

Primary Examiner—Jeffery A. Brier
Attorney, Agent, or Firm—Oblon, Spivak, McClelland, Maier & Neustadt

[57] ABSTRACT

A three-dimensional display apparatus approximates a three-dimensional object by planes and expresses each of the planes by pixels on a plurality of scan lines, thereby to acquire a display image. A designation circuit designates a plurality of pixels on a target scan line, a depth data generator generates depth data of the designated pixels, and a luminance data generator generates luminance data thereof. Depth memory stores depth data. Luminance memory stores luminance data. A comparator reads out the depth data of designated pixels from the depth memory. Upon reception of depth data of the pixels generated from the depth data generator, the comparator compares the read depth data with the received depth data with respect to the same pixel. In accordance with a comparison result of the comparator, a controller updates the contents of the depth memory and the luminance memory to respectively have the depth data generated and the luminance data generated by the generators, with respect to that pixel whose position defined by the depth data generated from the depth data generator, is located on a visible side of a position defined by the depth data read out from the depth memory. A display unit displays the contents of the luminance memory.

14 Claims, 5 Drawing Sheets

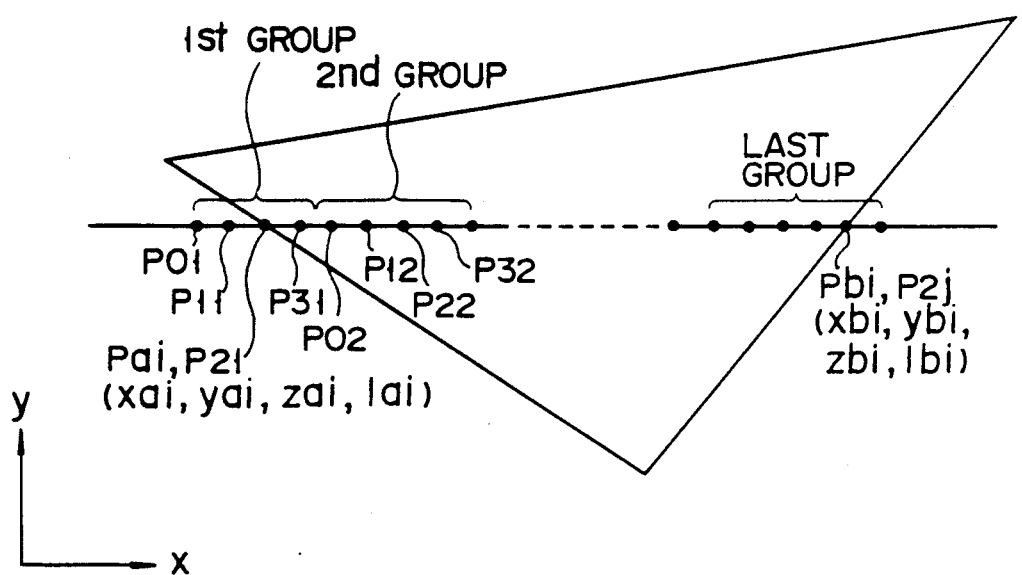
F I G. 4

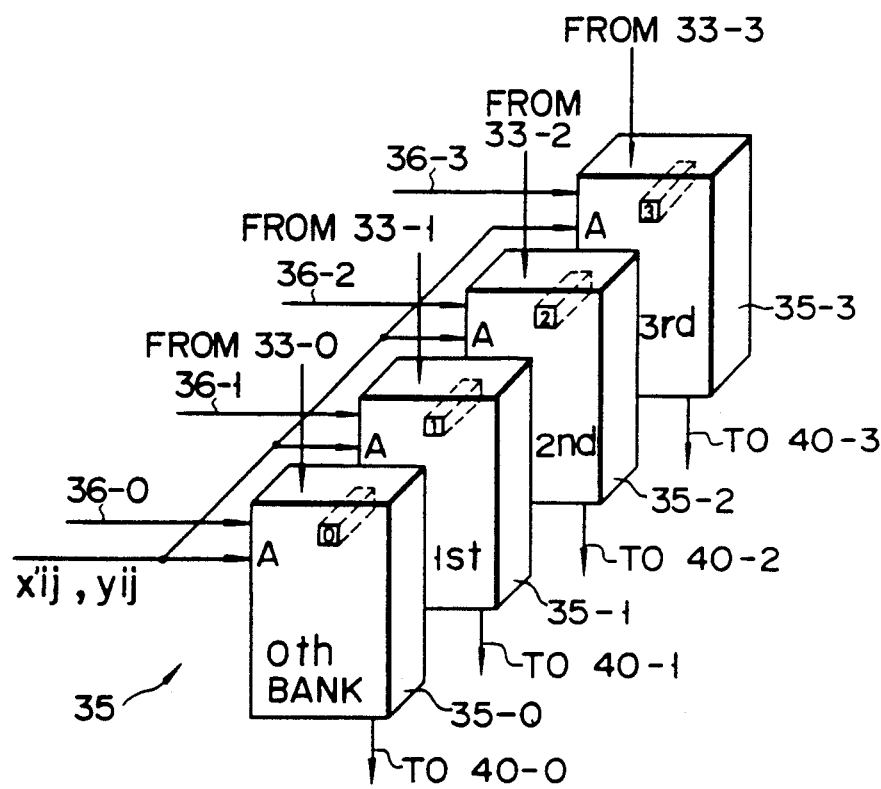
F I G. 6
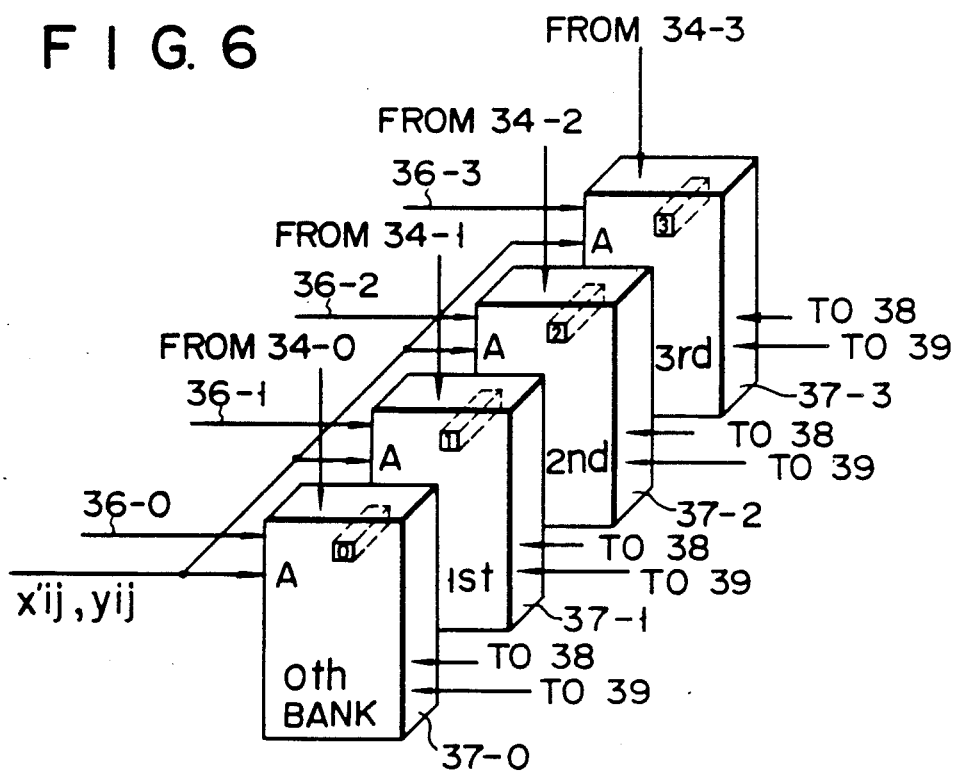
F I G. 7

THREE-DIMENSIONAL DISPLAY APPARATUS

BACKGROUND OF THE INVENTION

1. Field of the Invention

The present invention relates to a three-dimensional display apparatus suitable for approximating a three-dimensional object by means of a set of planes within a three-dimensional space, approximating each plane by way of a set of scan lines, executing a shading process for each scan line and displaying the three-dimensional object on a two-dimensional display.

2. Description of the Related Art

In a computer system, a graphic processing technique for displaying a three-dimensional object on a raster scan color display monitor has a great importance. Basically, a graphic processing progresses as follows:

(1) Using Computer Aided Design (CAD), a surface of a three-dimensional object is approximated by a set of triangles in a three-dimensional space (see FIG. 1). Methods for approximating a three-dimensional object using trapezoids or rectangles as well as a set of triangles are known. (2) Coordinates and luminance values of vertexes of each triangle are determined. (3) Coordinates and luminance values of intersections Pai and Pbi of a given scan line and two sides of each triangle are calculated, as shown in FIG. 2. Coordinates and luminance values of pixels on the scan line connecting intersections Pai and Pbi are calculated, and the luminance values displayed on a display monitor.

FIG. 3 shows an arrangement of a conventional three-dimensional display apparatus. FIG. 3 is substantially the same as FIG. 2A of U.S. Pat. No. 4,475,104, which is incorporated thus in present specification, along with the associated explanation given in the above-mentioned U.S. Patent.

The aforementioned processing (3) is performed as follows in the three-dimensional display apparatus shown in FIG. 3:

A controller 11 receives, from a data base (not shown), vertex information (coordinates and luminance values) of each of n triangles approximating a three-dimensional object. For ease of understanding, assume that what controller 11 receives are the coordinates and luminance values of vertexes P1, P2, and P3 of a triangle shown in FIG. 2. On the basis of the vertex information received, controller 11 then calculates increments (unit increments) $\Delta xa$, $\Delta za$, and $\Delta Ia$ of parameters x, z, and I for side Ea, when y is increased by one (unit length), and, similarly, unit increments $\Delta xb$, $\Delta zb$, and $\Delta Ib$ of parameters x, z, and I for side Eb.

Next, controller 11 sets the x- and y-coordinates x1, y1 of vertex P1 in an X-Y coordinate generator 12, and, at the same time, sets a z-coordinate z1 and a luminance I1 of vertex P1 in a X coordinate generator 13 and a luminance generator 14, respectively.

Thereafter, controller 11 drives generators 12–14 and outputs a write-enable signal 15 to AND gate 19. These three generators, 12–14, generate approximate coordinates and luminance values of the individual pixels on each of the scan lines, from the scan line (first scan line) passing vertex P1 to the one ((y2−y1+1)-th scan line) passing vertex P2, as follows.

There is only one pixel on the first scan line at point P1. X-Y coordinate generator 12 generates x- and y-coordinates x1, y1, Z coordinate generator 13 generates coordinate z1, and luminance generator 14 generates luminance value I1.

A Z memory 16 stores z-coordinates for the individual pixels. When memory 16 is addressed by x- and y-coordinates from generator 12, a z-coordinate at the designated address position is read out therefrom and is compared, by a comparator 17, with a z-coordinate generated by Z coordinate generator 13.

When the coordinate from the latter is smaller than that from the former, comparator 17 sets a write-enable signal 18 at logic "0." In response to this signal an AND gate 19 sets its output signal, write signal 21, at logic "0" irrespective of write-enable signal 15. As a result, the z-coordinate in Z memory 16 and luminance value I in a luminance memory 20 are left unchanged.

On the other hand, when the z-coordinate from generator 13 is larger than the one read out from Z memory 16, comparator 17 outputs write enable signal 18 of logic "1" to AND gate 19. In response to this signal 18, AND gate 19 outputs signal 21 of level "1" to Z memory 16 and luminance memory 20. Upon receipt of signal 21, Z memory 16 stores a new z-coordinate (z1) generated from generator 13 in a storage area designated by x- and y-coordinates from generator 12. Similarly, luminance memory 20 stores a new luminance value I (I1) generated by luminance generator 14 in a storage area designated by x- and y-coordinates from generator 12. The above completes the process for the first scan line.

The following processing is executed for those scan lines after the second line:

Given that the target scan line is the i-th scan line, the coordinates and luminance value of intersection Pai (the left end of the i-th scan line) between the i-th scan line and side Ea are acquired first. Then, the coordinates and luminance value of intersection Pbi (the right end of the i-th scan line) between the i-th scan line and side Eb are acquired. Based on the acquired coordinates and luminance values of both end points (Pai, Pbi), X-Y coordinate generator 12 sequentially generates x- and y-coordinates xij, yij from the first pixel. Similarly, Z coordinate generator 13 generates z-coordinates zij, and luminance generator 14 generates luminance values Iij. As a result, z-coordinate in Z memory 16 and the luminance value in luminance memory 20 are updated with respect to the j-th pixel on the i-th scan line, as is the case of vertex P1.

Then, the x-coordinate is incremented by one. And, the coordinates and luminance value for the next pixel indicated by j=j+1 are generated and the z-coordinate and luminance value in memories 16 and 20 are updated. When the updation is executed for intersection Pbi, shading for the i-th scan line is completed.

Shading is executed for the next scan line indicated by yi=yi+1 in the aforementioned procedures.

The above operations are repeated. Upon completion of shading for the scan line passing vertex P2, shading of a lower triangle ($\Delta P1P2P4$) in FIG. 2 is completed. Then, an upper triangle ($\Delta P2P3P4$) is also shaded in the same manner as the lower triangle. Consequently, z-coordinates and luminance values of the individual pixels in the triangle ($\Delta P1P2P3$) are updated in memories 16 and 20. The contents of luminance memory 20 are read out onto a CRT monitor 23 by a display timing circuit 22.

The aforementioned three-dimensional object is generally expressed by a significant number of pixels ranging between one million to ten millions. Therefore, calculation of three-dimensional coordinates and luminance values pixel by pixel as is done in the three-dimensional display apparatus shown in FIG. 3 is time-consuming for completion of an approximated image of a single object. In this respect, it is difficult to apply the conventional three-dimensional display apparatus to a field that requires high speed display, such as animation display.

SUMMARY OF THE INVENTION

It is therefore an object of this invention to provide a three-dimensional display apparatus capable of performing image processing at a high speed. To achieve this object, a three-dimensional display apparatus according to this invention comprises:

X-Y coordinate generator (32) for sequentially generating at least the upper (or most significant) (m-n) bits of an x-coordinate and a y-coordinate of every $2^n$-th pixel starting from a pixel at a start point of a target scan line to be shaded (m being a number of bits constituting an x-coordinate, and n being an integer equal to and greater than 1);

$2^n$ Z coordinate generators (33-0–33-3) for generating z-coordinates of consecutive $2^n$ pixels, on the target scan line, specified by the upper (m-n) bits of the x-coordinate and the y-coordinate generated from the X-Y coordinate generator (32);

Z memory including $2^n$ Z memory banks (35-0–35-3) provided in one-to-one correspondence with the $2^n$ Z coordinate generators (33-0–33-3), each of the $2^n$ Z memory banks (35-0–35-3) being coupled to the X-Y coordinate generator (32) and associated one of the Z coordinate generators (33), for being addressed by the upper (m-n) bits of the x-coordinate and the y-coordinate generated from the X-Y coordinate generator (32) and storing a z-coordinate generated from the associated Z coordinate generator (33);

$2^n$ luminance generators (34) for generating luminance values of the consecutive $2^n$ pixels;

Luminance memory (37) including $2^n$ luminance memory banks (37-0–37-3) provided in one-to-one correspondence with the $2^n$ luminance generators (34), each of the $2^n$ luminance memory banks (37-0–37-3) being coupled to the X-Y coordinate generator (32) and associated one of the luminance generator (34), for being addressed by the upper (m-n) bits of the x-coordinate and the y-coordinate generated from the X-Y coordinate generator (32) and storing a luminance value generated from the associated luminance generator (34);

display device (38, 39) for displaying contents of the luminance memory (37);

controller (31), coupled to the X-Y coordinate generator (32), the $2^n$ Z coordinate generators (33) and the $2^n$ luminance generators (34), for setting initial values in the X-Y coordinate generator (32), the $2^n$ Z coordinate generators (33) and the $2^n$ luminance generators (34) for each scan line and controlling data writing and data writing inhibition of the $2^n$ Z memory banks (35) and the $2^n$ luminance memory banks (37);

$2^n$ comparators (40), provided in one-to-one correspondence with the $2^n$ Z coordinate generators (33), each of the comparators (40) being coupled to associated Z coordinate generator (33) and associated Z memory bank (35), for comparing a z-coordinate stored in a region, of the associated Z memory bank, specified by the X-Y coordinate generator (32) with a z-coordinate generated from the associated Z coordinate generator (33); and writing circuit (42), coupled to the $2^n$ comparators (40) and the controller (31), for selectively setting each of the Z memory banks (35) and the luminance memory banks (37) to one of a write enable state and a write disable state in response to comparison results of the comparators (40) and a write instruction from the controller (31), writing the z-coordinates from the Z coordinate generators (33) into the Z memory (35) in the write enable state and writing the luminance values from the luminance generators (34) into the luminance memory (37) in the write enable state.

With the above arrangement, the three-dimensional display apparatus according to this invention can perform a simultaneous shading process for a plurality of pixels and can therefore improve the processing speed as compared with the conventional three-dimensional display apparatus which sequentially performs a shading process pixel by pixel.

BRIEF DESCRIPTION OF THE DRAWINGS

FIG. 4 is a diagram illustrating the i-th scan line in order to explain the operation of a three-dimensional apparatus according to one embodiment of this invention;

FIG. 6 is a block diagram illustrating the structure of a Z memory shown in FIG. 5;

FIG. 7 is a block diagram illustrating the structure of a luminance memory shown in FIG. 5.

DETAILED DESCRIPTION OF THE INVENTION

One feature of this invention lies in that consecutive $2^n$ pixels on scan lines are simultaneously processed. An explanation of the three-dimensional display apparatus according to one embodiment will be given with reference to the case where the number of simultaneously processed pixels is 4 (i.e., n=2).

In the following description, as shown in FIG. 4, consecutive four pixels including the one located at the beginning (left end) of a scan line are defined to be a first group of pixels P01–P31, with the next consecutive four pixels a second group of pixels P02–P32. Similarly, the j-th group of four pixels starting from the first group of pixels P01–P31 are defined to be the j-th group of pixels P0j–P3j (j=1, 2, ...). Given that Xai is the x-coordinate of the start point of the scan line and Xbi the x-coordinate of the end point, j is an integer satisfying $$1 \leq j \leq (Xbi - Xai + 4)/4.$$

Figure 5:
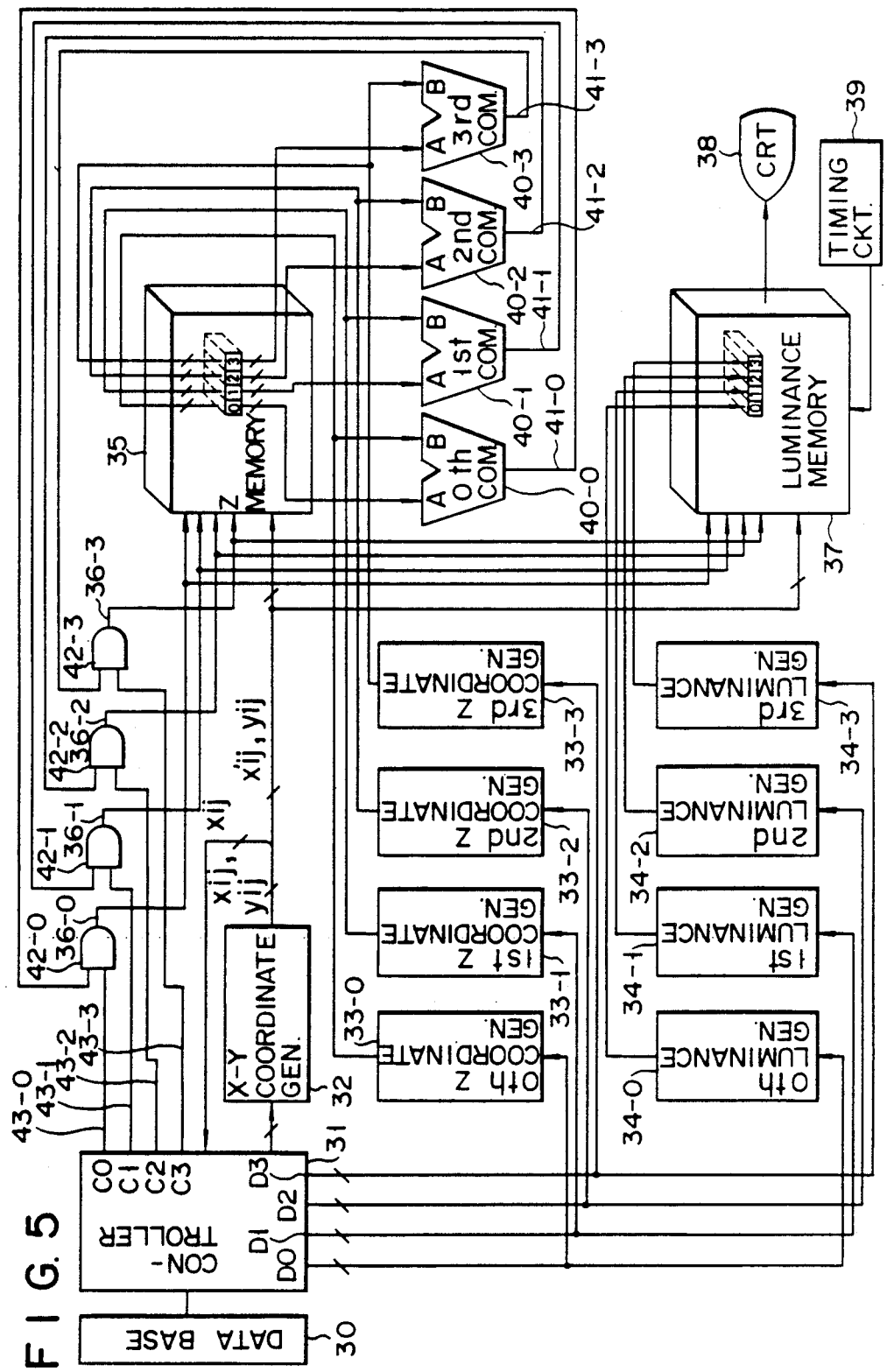
FIG. 5 is a block diagram illustrating the arrangement of the three-dimensional display apparatus according to this embodiment.

The arrangement of the three-dimensional display apparatus will be explained below referring to FIG. 5.

A controller 31, which is coupled to a data base 30, performs the general control of the display apparatus and comprises a CPU and its peripheral units. An X-Y coordinate generator 32, which is coupled to controller 31, sequentially generates x- and y-coordinates (xij, yij) of pixels on a scan line that is the approximation of a plane in a three-dimensional space, every $2^n$ pixels (n: an integer equal to or greater than 1) from the starting pixel. The value n is supplied to X-Y coordinate generator 32 from controller 31; in this embodiment, n is 2 so that generator 32 generates x- and y-coordinates of every fourth ($=2^2$-th) pixel. In the example shown in FIG. 4, X-Y coordinate generator 32 sequentially generates the x- and y-coordinates of pixels P21, P22, . . . , P2j.

The generated x-coordinates are supplied to controller 31.

Zeroth to third Z coordinate generators 33-0-33-3 are respectively coupled to data output terminals D0-D3 of controller 31. These four Z coordinate generators 33-0-33-3 are associated with the zeroth to third pixels of each pixel group and generate z-coordinates zij (depth data) of the associated pixels. Z coordinate generators 33-0-33-3 respectively generate the z-coordinates of consecutive $2^2$ pixels (zeroth to third pixels) P0j-P3j. For instance, the zeroth Z coordinate generator 33-0 generates the z-coordinate of the zeroth pixel P0j of the j-th group.

Z memory 35 has its data input terminal coupled to data output terminals of Z coordinate generators 33-0-33-3. Of the output data of X-Y coordinate generator 32, the value (x'ij) of those bits (m-n) other than the lower (or least significant) two ($=n$) bits of the x-coordinate (xij) and y-coordinate (yij) are supplied to an address terminal of Z memory 35. The reason why the value x'ij which is the x-coordinate excluding the lower two bits is supplied to Z memory 35 is that the pixel group can be designated by the coordinates x'ij, zij.

Z memory 35 has write control terminals supplied with write permit signals 36-0-36-3 output from AND gates 42-0-42-3 (which will be described later). In accordance with the levels of write permit signals, Z memory 35 stores the z-coordinates of pixels P0j-P3j of the j-th group generated from Z coordinate generators 33-0-33-3, in areas specified by the coordinates (x'ij, yij) from X-Y coordinate generator 32.

Zeroth through third comparators 40-0 to 40-3 have input terminals A coupled to the data output terminal of Z memory 35, and have input terminals B coupled to associated Z coordinate generators 33-0-33-3. Comparators 40-0-40-3 compare the z-coordinates of pixels P0j-P3j from Z coordinate generators 33-0-33-3 with z-coordinates read out from Z memory 35 and output write enable signals 41-0 to 41-3 in accordance with the comparison results.

Zeroth through third AND gates 42-0-42-3 have first input terminals respectively supplied with control signals 43-0 to 43-3 from control terminals C0-C3 of controller 31. AND gates 42-0-42-3 have the other input terminals supplied with write enable signals 41-0-41-3 from comparators 40-0-40-3. The output signals of AND gates 42-0-42-3 are supplied as the aforementioned write permit signals 36-0-36-3 to Z memory 35 and a luminance memory 37.

Zeroth through third luminance generators 34-0-34-3, coupled to data output terminals D0-D3 of controller 31, are provided for the zeroth to third pixels of each groups, respectively. Luminance generators 34-0-34-3 generate luminance values (Iij) which are color densities of consecutive four pixels P0j-P3j of the j-th group.

For instance, zeroth luminance generator 34-0 generates the luminance value of pixel P0j of the j-th group.

Luminance memory 37 has a data input terminal coupled to data output terminals of luminance generators 34-0-34-3. Of the output data of X-Y coordinate generator 32, the value (x'ij) of those bits other than the lower two bits of the x-coordinate xij and y-coordinate (yij) are supplied to an address terminal of luminance memory 37. Luminance memory 37 has write control terminals supplied with write permit signals 36-0-36-3 output from AND gates 42-0-42-3. In accordance with the levels of write permit signals, luminance memory 37 stores the luminance values of pixels P0j-P3j of the j-th group generated from luminance generators 34-0-34-3, in areas specified by the coordinates (x'ij, yij).

A CRT monitor 38 and a display timing circuit 39 are coupled to luminance memory 37 such that the contents of luminance memory 37 are read out by timing circuit 39 and displayed on CRT monitor 38.

Practical arrangements of Z memory 35 and luminance memory 37 will be explained below referring to FIGS. 6 and 7. As illustrated in FIG. 6, Z memory 35 comprises zeroth through third memory banks 35-0-35-3, which are provided in association with the zeroth to third pixels of each group and store z-coordinates of the associated pixels. Memory banks 35-0-35-3 receive x-coordinates x'ij and y-coordinates yij as a common address. These memory banks 35-0-35-3 also respectively receive write permit signals 36-0-36-3 from zeroth to third AND gates 42-0-42-3 and z-coordinates zij from zeroth to third Z coordinate generators 33-0-33-3. Zeroth to third memory banks 35-0-35-3 have their output terminals coupled to the respective zeroth to third comparators 40-0-40-3. Therefore, zeroth memory bank 35-0 stores the z-coordinate from zeroth Z coordinate generator 33-0 in an area specified by x'ij and yij in accordance with the level of write permit signal 36-0. When write permit signal 36-0 is write disable level, zeroth memory bank 35-0 reads out the z-coordinate from the area specified by the coordinates (x'ij, yij) from X-Y coordinate generator 32 and supplies it to zeroth comparator 40-0. Similarly, first through third memory banks 35-1-35-3 store z-coordinates zij from the respective first to third Z coordinate generators 33-1-33-3 in areas specified by x'ij and yij in accordance with write permit signals 36-1-36-3, and these memory banks 35-1-35-3 read out the z-coordinates from the areas specified by the coordinates (x'ij, yij) from X-Y coordinate generator 32 when write permit signals 36-1-36-3 are write disable levels, and supply them to first to third comparators 40-1-40-3, respectively.

As illustrated in FIG. 7, luminance memory 37 comprises zeroth through third memory banks 37-0-37-3, which are provided in association with the zeroth to third pixels of each group and store luminance values of the associated pixels. Zeroth to third memory banks 37-0-35-3 receive x-coordinates x'ij and y-coordinates yij as a common address, and also respectively receive write permit signals 36-0-36-3 from zeroth to third AND gates 42-0-42-3 and z-coordinates zij from zeroth to third Z coordinate generators 33-0-33-3. Zeroth to third memory banks 37-0-37-3 respectively receive the luminance values from zeroth to third luminance generators 34-0-34-3. More specifically, therefore, zeroth memory bank 37-0 stores the luminance value from zeroth luminance generator 34-0 in an area specified by x'ij and yij in accordance with the level of write permit signal 36-0. Similarly, first through third memory banks 37-1-37-3 store the luminance values from the respective first to third luminance generators 34-1-34-3 in areas specified by x'ij and yij in accordance with the levels of write permit signals 36-1-36-3. Each of memory banks 37-0-37-3 is coupled to CRT 38 and timing circuit 39.

An explanation will now be given on the operation of three-dimensional display apparatus according to the embodiment.

Figure 1:
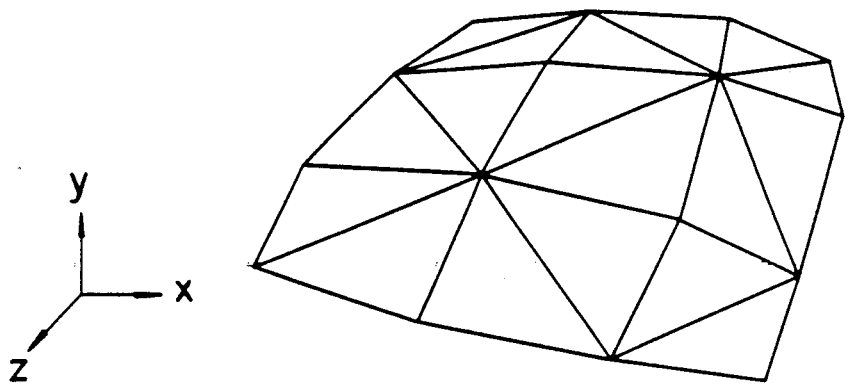
FIG. 1 is a diagram for explaining an example of a method for approximating a three-dimensional object with a plurality of triangles.

Data base 30 approximates a target three-dimensional object with a set of triangles in a three-dimensional space, as shown in FIG. 1. Data base 30 sequentially sends information (three-dimensional coordinates and luminance values) of the vertexes of the individual triangles to controller 31. Assume now that data base 30 sends the three-dimensional coordinates (x1, y1, z1), (x2, y2, z2) and (x3, y3, z3) and luminance values I1, I2 and I3 of vertexes P1, P2 and P3 of a triangle shown in FIG. 2, to controller 31.

Upon reception of the information, controller 31 calculates an increment (unit increment) of each of x, z and I for side Ea as well as side Eb when y increases by one (unit length). Given that $\Delta xa$, $\Delta za$, $\Delta Ia$ are unit increments of x, z and I for side Ea and $\Delta xb$, $\Delta zb$ and $\Delta Ib$ are unit increments of x, z and I for side Eb, these increments can be calculated from the following equations (1) and (2).

$$\Delta xa = (x2 - x1)/(y2 - y1) \quad (1)$$
$$\Delta za = (z2 - z1)/(y2 - y1)$$
$$\Delta Ia = (I2 - I1)/(y2 - y1)$$
$$\Delta xb = (x3 - x1)/(y3 - y1) \quad (2)$$
$$\Delta zb = (z3 - z1)/(y3 - y1)$$
$$\Delta Ib = (I3 - I1)/(y3 - y1)$$

Figure 2:
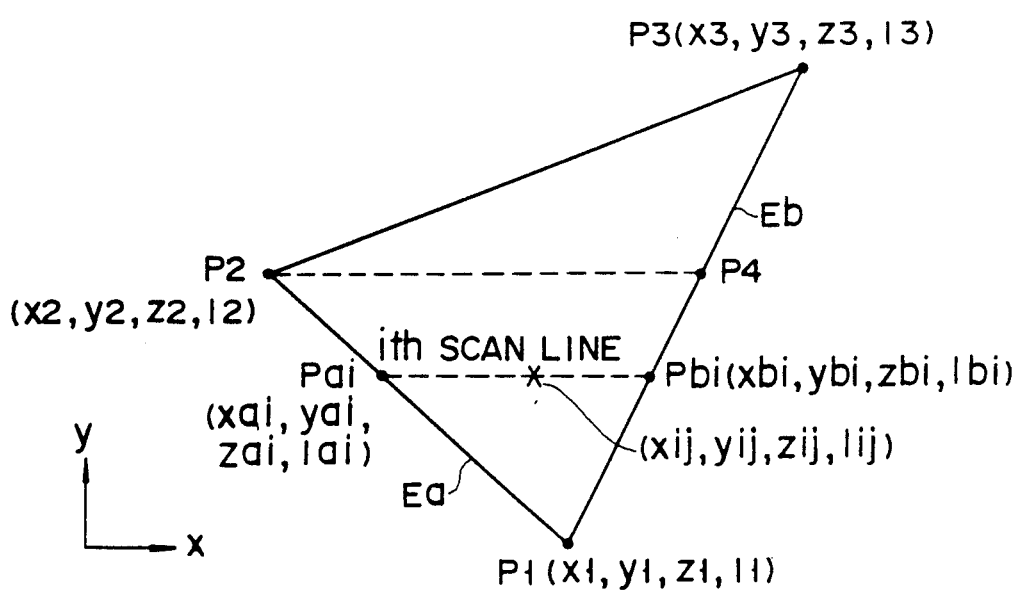
FIG. 2 is a diagram for explaining a method for displaying each pixel.
Figure 3:
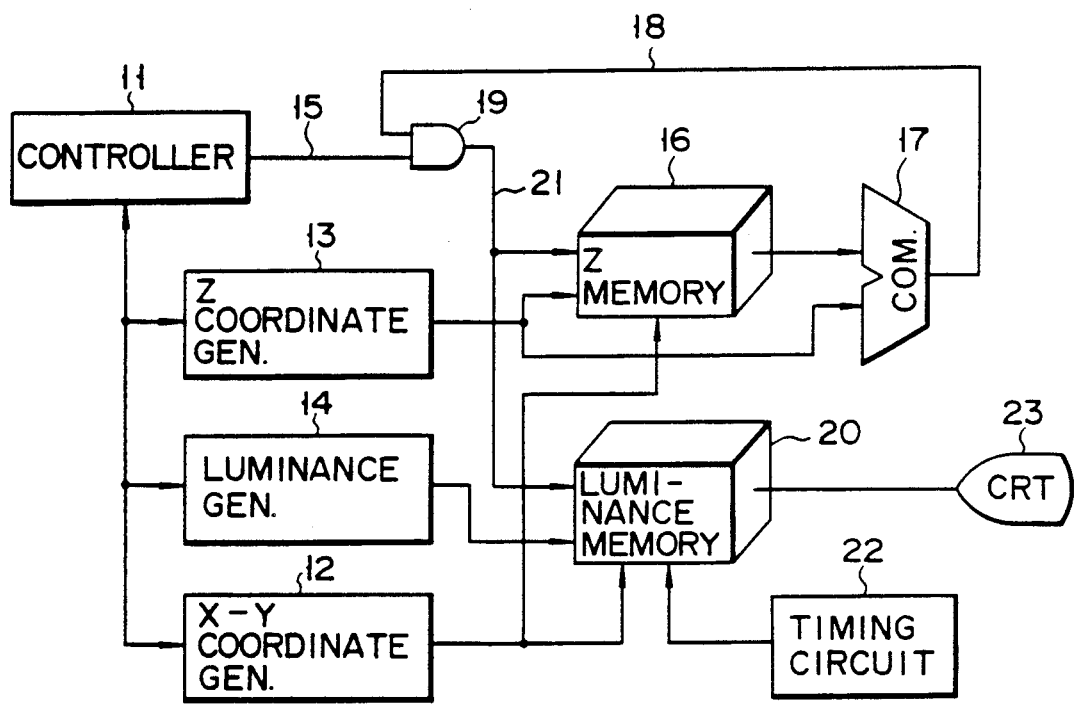
FIG. 3 is a block diagram for explaining an example of the arrangement of a conventional three-dimensional display apparatus.

After acquiring the unit increments, controller 31 acquires approximate coordinates and luminance value of both ends of each of scan lines from the first scan line passing vertex P1 and the (y2-y1+1)-th one passing vertex P2 in FIG. 2. Assume that the i-th scan line is a target scan line, that xai and yai, zai and Iai are x- and y-coordinates, z-coordinate and luminance value of the start point (intersection Pai between the i-th scan line and side Ea), respectively, and that xbi and ybi, zbi and Ibi are x- and y-coordinates, z-coordinate and luminance value of the end point (intersection Pbi between the i-th scan line and side Eb), respectively. Then, these coordinates and luminance values can be acquired by equations (3) below.

$$xai = xa(i - 1) + \Delta xa \quad (3)$$
$$zai = za(i - 1) + \Delta za$$
$$Iai = Ia(i - 1) + \Delta Ia$$
$$xbi = xb(i - 1) + \Delta xb$$
$$zbi = zb(i - 1) + \Delta zb$$
$$Ibi = Ib(i - 1) + \Delta Ib$$
where:
$$xa1 = xb1 = x1$$
$$za1 = zb1 = z1$$
$$Ia1 = Ib1 = I1$$

Based on the acquired values, controller 31 executes a shading process for each scan line, which will now be explained referring to the i-th scan line and FIG. 4.

Using equation (3), controller 31 acquires three-dimensional coordinates (xai, yai, zai) and (xbi, ybi, zbi) and luminance values Iai and Ibi of both ends Pai and Pbi of the i-th scan line. Controller 31 then sets the acquired approximate coordinates xai and yai of the start point Pai of the i-th scan line in X-Y coordinate generator 32 as the x- and y-coordinates xil and yil of the start pixel of the i-th scan line.

Based on the lower two bits of the x-coordinate xil of the start pixel, controller 31 discriminates which one of pixels P01-P31 the start pixel is. If the lower two bits of the x-coordinate xil are 00, controller 31 discriminates the start pixel to be the zeroth pixel P01. Similarly, controller discriminates the start pixel to be the first pixel P11 if the lower two bits of the x-coordinate xil are 01, discriminates the start pixel to be the second pixel P21 if these lower two bits are 10 and discriminates the start pixel to be the third pixel P31 if these lower two bits are 11. When the start pixel is discriminated to be the k-th pixel Pkl (k: one of 0-3) of the first group, controller 31 sets the z-coordinate zai of the start pixel, as the initial value zil, in the k-th Z coordinate generator 33-k for generating the z-coordinate of the k-th pixel pkl and sets the luminance value Iai of the start pixel, as the initial value Iil, in the k-th luminance generator 34-k for generating the luminance value of the k-th pixel Pkl. Controller 31 also sets z-coordinates of the other pixels in their respective Z coordinate generators with zai being the z-coordinate of the k-th pixel Pkl. Similarly, controller 31 sets the luminance of the other pixels in their respective luminance generators with Iai being the luminance value of the k-th pixel Pkl.

The operation of controller 31 will be specifically explained below with k=2 referring to FIG. 4. With k=2, controller 31 sets the z-coordinate zai of the start pixel (at Pai) of the i-th scan line, as the initial value zil (j=1), in second Z coordinate generator 33-2 and set the luminance value Iai of the same start pixel, as the initial value Iil, in second luminance generator 34-2.

Controller 31 also sets zai-2×$\Delta$zi as the initial value zil in Z coordinate generator 33-0 associated with the zeroth pixel P0j and set Iai-2×$\Delta$Ii as the initial value Iil in luminance generator 34-0 also associated with the zeroth pixel P0j. Here, $\Delta$zi and $\Delta$Ii represent the increments of z and I with an increment of x by one pixel on the i-th scan line and are given by the following equations (4):

$$\Delta zi = (zbi - zai)/(xbi - xai) \quad (4)$$
$$\Delta Ii = (Ibi - Iai)/(xbi - xai)$$

Similarly, controller 31 sets zai-$\Delta$zi and Iai-$\Delta$Ii as the initial values zil and Iil respectively in Z coordinate generator 33-1 and luminance generator 34-1 which are associated with the first pixel P1j while setting zai+$\Delta$zi and Iai+$\Delta$Ii as the initial values zil and Iil respectively in Z coordinate generator 33-3 and luminance generator 34-3 which are associated with the third pixel P3j. In other words, controller 31 acquires the initial values zil and Iil of the z-coordinates and the luminance values of those three of the first group of pixels P01-P31 other than the start pixel, based on the z-coordinate zai and luminance value Iai of the start pixel on the i-th scan line. Then, controller 31 sets the acquired initial values in Z coordinate generators 33-0-33-3 and luminance generators 34-0-34-3.

Figure 8:
FIG. 8 is a view illustrating data set as the initial values in generators 33-0–33-3 and 34-0–34-3 shown in FIG. 5.

FIG. 8 gives a clear illustration of data set as the initial values in generators 33-0-33-3 and 34-0-34-3.

Upon completion of the above initialization, controller 31 drives X-Y coordinate generator 32, Z coordinate generators 33-0-33-3 and luminance generators 34-0-34-3, which in turn generate the coordinates and luminance values of the j-th group of pixels sequentially from j=1, in accordance with equation (5) below.

$$yij = yi$$
$$xij = xi(j - 1) + 4$$
$$zij = zi(j - 1) + 4 \times \Delta zi$$
$$Iij = Ii(j - 1) + 4 \times \Delta Ii$$
(5)

where xi1=xai $$zij = zai + a \times \Delta zi$$

$$Iij = Iai + a \times \Delta Ii$$

α: an integer satisfying $-3 < a < 3$ and determined by deviation from the start point
j: an integer satisfying $1 \leq j \leq (xbi-xai+4)/4$.

In equation (5), $4 \times \Delta zi$ and $4 \times Ii$ represent increments of z and I with an increment of x by four (four pixels) on the i-th scan line.

As should be understood from equation (5), X-Y coordinate generator 32 sequentially generates the x- and y-coordinates xij and yij of the pixels on the i-th scan line every $2^n$ pixel starting from the coordinates xi1 and yi1 of the start pixel. Specifically, given that the start pixel on the i-th scan line is the k-th pixel Pk1 (k being any of 0–3), X-Y coordinate generator 32 sequentially generates the x- and y-coordinates xij and yij of the k-th pixel Pkj of every group on the i-th scan line, starting from Pk1 (j=1).

Z coordinate generators 33-0–33-3 sequentially generate the z-coordinates zij of pixels P0j–P3j of the j-th group on the i-th scan line, starting from the z-coordinates zi1 of pixels P01–P31 of the first group. Although the same symbol zij is used for different z-coordinates, the output data of generators 33-0–33-3 differ as shown in, for example, FIG. 8.

Luminance generators 34-0–34-3 sequentially generate the luminance values Iij of pixels P0j–P3j of the j-th group on the i-th scan line, starting from the luminance values Ii1 of pixels P0t–P31 of the first group. Although the same symbol Iij is used for different luminance values, the output data of generators 34-0–34-3 differ as shown in FIG. 8.

There may be a case where the start pixel on the i-th scan line is not P01, i.e., where the lower two bits of the x-coordinate xi1 (=xai) of the start pixel is not 00. In this case, there exists a pixel, among the first group of pixels P01–P03, which is deviated from the i-th scan line. For instance, if the start pixel is P21 as shown in FIG. 4, two pixels P01 and P11 are deviated from the i-th scan line. Updation should not be performed with respect to those pixels deviated from the target scan line. In the cycle with j=1, therefore, controller 31 discriminates again which one of the first group of pixels P01–P31 the first pixel on the i-th scan line is, on the basis of the lower two bits of the x-coordinate xij. In accordance with the discrimination result, controller 31 produces write enable signals 43-0–43-3. For instance, if the lower two bits of the x-coordinate xi1 (=xai) indicates k, controller 31 sets the associated control signals at level "0" in order to inhibit writing of data about those pixels located on the left side of pixel Pk1 into Z memory 35 and luminance memory 37. If the start pixel is P21 as shown in FIG. 4, controller 31 sets control signals 43-0 and 43-1 at level "0" and sets control signals 43-2 and 43-3 at level "1" in the cycle with j=1.

Assume that X-Y coordinate generator 32 has generated the x- and y-coordinates xij and yij of the k-th pixel Pkj of the j-th group on the i-th scan line, Z coordinate generators 33-3–33-3 have generated the z-coordinates zij of pixels P0j–P3j of the j-th group, and luminance generators 34-3–34-3 have generated the luminance values Iij of pixels P0j–P3j of the j-th group. Memory banks 35-0–35-3 of Z memory 35 are addressed by the aforementioned coordinates x'ij and yij. The z-coordinates of pixels P0j–P3j of the j-th group written at the associated addresses in memory banks 35-0–35-3 are read out and supplied to input terminals A of comparators 41-0–41-3. The input terminals B of these comparators 40-0–40-3 are supplied with the z-coordinates zij of the j-th group generated from Z coordinate generators 33-0–33-3. Comparators 40-0–40-3 each compare both of the received input data with each other. If the z-coordinates (a newly generated figure) from generators 33-0–33-3 are located behind (hidden from) the z-coordinates (an already-formed figure) generated from memory banks 35-0–35-3 (i.e., if A>B), comparators 40-0–40-3 set the associated write enable signals 41-0–41-3 at logical level "0." On the other hand, if the z-coordinates from generators 33-0–33-3 are located in front of (on the visible side of) the z-coordinates generated from memory banks 35-0–35-3 (i.e., if A≦B), comparators 40-0–40-3 set the associated write enable signals 41-0–41-3 at logical level "1."

When write enable signals 41-0–41-3 have logical level "1," AND gates 42-0–42-3 output control signals 43-0–43-3 from controller 31 as write permit signals 36-0–36-3. Assuming that write permit signal 36-f (f: one of 0-3) with logical level "1" has been supplied to the f-th memory bank 35-f of Z memory 35 and the f-th memory bank 37-f of luminance memory 37, memory banks 35-f and 37-f become a write enable state. Accordingly, the z-coordinate stored in memory bank 35-f at the area specified by coordinates x'ij and yij is replaced by the z-coordinate zij from Z coordinate generator 33-f, and the luminance value stored in memory bank 37-f at the area specified by coordinates x'ij and yij is replaced by the luminance value Iij from luminance generator 37-f. If write permit signal 36-f with level "0" is supplied to the f-th memory banks 35-f and 37-f, these memory banks become a write disable state and the contents of the areas of the memory banks specified by the coordinates x'ij and yij are retained.

The above completes the updating/storage processing of the z-coordinate in Z memory 35 and the luminance value in luminance memory 37 with respect to pixels P0j–P3j of the j-th group on the i-th scan line. Then, X-Y coordinate generator 32 increments the value of x by four and outputs it. And, generators 33-0–33-3 and 34-0–34-3 respectively produce the z-coordinates and luminance values for the associated four pixels of the next group designated by j=j+1, in accordance with equation (5). The updation/storage process of the z-coordinate in Z memory 35 and the luminance value I in luminance memory 37 is then executed in the same manner as is done for the previous four pixels.

Controller 31 monitors those bits x'ij of the x-coordinate xij from X-Y coordinate generator 32 other than the lower two bits thereof. When the coordinate x'ij coincides with the contents of those bits of the x-coordinate xbi of pixel Pbi at the end point of the i-th scan line other than the lower two bits thereof, controller 31 discriminates that the shading process for the i-th scan line has reached the final cycle. Based on the lower two bits of the coordinate xbi, controller 31 discriminates which of the four pixels of the last group the last pixel is. If the lower two bits of the coordinate xbi is 00 and the last pixel is P0j, the first to third pixels P1j-P3j of the last group are off the i-th scan line. Consequently, controller 31 sets control signals 43-1–43-3 at level "0" in order to inhibit the updation operation of Z memory 35 and luminance memory 37 with respect to pixels P1j-P3j. If the lower two bits of the coordinate xbi is 01, controller 31 sets write enable signals 43-2 and 43-3 associated with pixels P2j and P3j which are off the i-th scan line at level "0." If the lower two bits of the coordinate xbi is 10, controller 31 sets write enable signal 43-3 associated with pixel P3j which is off the i-th scan line at level "0." If the lower two bits of the coordinate xbi is 11, there is no pixel included in the last group which is off the i-th scan line, so that controller 31 set all of control signals 43-0–43-3 at level "1." Then, Z coordinate generators 33-0–33-3 generate the z-coordinates of the pixels of the last group, while luminance generators 34-0–34-3 generate the luminance values of these pixels. As a result, the shading process cycle for the last group including the end point Pbi of the i-th scan line is executed.

The sequence of the above operation will now be explained referring to the triangle shown in FIG. 4 and the i-th scan line. Controller 31 acquires the necessary data in accordance with equations (1) to (5). Then, controller 31 sets the x- and y-coordinates of the start pixel P21 (Pai) in X-Y coordinate generator 32. Controller 31 further sets the z-coordinate of pixel P01 in zeroth Z coordinate generator 35-0, sets the z-coordinate of pixel P11 in first Z coordinate generator 35-1, sets the z-coordinate of pixel P21 in second Z coordinate generator 35-2, and sets the z-coordinate of pixel P31 in third Z coordinate generator 35-3. Similarly, controller 31 sets the luminance value of pixel P01 in zeroth luminance generator 37-0, sets the luminance value of pixel P11 in first luminance generator 37-1, sets the luminance value of pixel P21 in second luminance generator 37-2, and sets the luminance value of pixel P31 in third luminance generator 37-3. Further, controller 31 sets control signals 43-0 and 43-1 at level "0" in order to inhibit the updation for pixels P01 and P11 which are off the i-th scan line, and sets control signals 43-2 and 43-3 at level "1." Controller 31 then drives all the generators.

X-Y coordinate generator 32 generates the x- and y-coordinates of start point p21. Pixels p01-p31 of the first group are commonly designated by those bits x'il of the x-coordinate of start point p21 other than the lower two bits thereof and the y-coordinate yil. Upon reception of the coordinates x'ij and yij, zeroth memory bank 35-0 supplies the already-stored z-coordinate of pixel P01 to comparator 40-0. Similarly, first to third memory banks 35-0 to 35-3 supply the z-coordinates of pixels P01-P31 to comparators 40-1–40-3. Zeroth Z coordinate generator 33-0 supplies the z-coordinate of pixel P01 to comparator 40-0. Similarly, first to third Z coordinate generators 33-1–33-3 supply the z-coordinates of pixels P01-P31 to comparators 40-1–40-3. Comparators 40-0–40-3 each compare both of the received data with each other; these comparators output write enable signals 41-0–41-3 with level "1" when the newly-generated z-coordinates are greater than those read out from Z memory 35 and are located on the visible side. Zeroth to third luminance generators 34-0–34-3 supply the luminance values of pixels P01-P31 to the associated memory banks 37-0–37-3. Since control signals 43-0 and 43-1 are at level "0," their associated write permit signals have level "0" so that no updation is performed on the contents of zeroth and first memory banks 35-0 and 35-1 of Z memory 35 and the contents of zeroth and first memory banks 37-0 and 37-1 of luminance memory 37. Meanwhile, since control signals 43-2 and 43-3 are at level "1," the outputs of AND gates 42-2 and 42-3 vary in accordance with the comparison results of comparators 40-2 and 40-3. Consequently, the contents of second and third memory banks 35-2 and 35-3 of Z memory 35 and the contents of second and third memory banks 37-2 and 37-3 of luminance memory 37 are updated in accordance with the comparison results of comparators 40-2 and 40-3. The above completes the shading process for the first group of pixels, and the same process will be executed for the second group.

Controller 31 sets control signals 43-0 to 43-3 at level "1," and X-Y coordinate generator 32 generates the x- and y-coordinates of pixel P22. Upon reception of the coordinates x'ij and yij, zeroth to third memory banks 35-0–35-3 supply the z-coordinates of pixels P02-P32 to comparators 40-0–40-3, while zeroth to third Z coordinate generators 35-0–35-3 supply the z-coordinates of pixels P02-P32 to these comparators 40-0–40-3. Comparators 40-0–40-3 each compare both of the received data with each other and output write enable signals 41-0–41-3 representing the comparison results. Zeroth to third luminance generators 34-0–34-3 supply the luminance values of pixels P02-P32 to the associated memory banks 37-0–37-3. Since control signals 43-0–43-3 are at level "1," the output of AND gates 37-0–37-3 vary in accordance with the comparison results of comparators 40-0–40-3 so that the contents of Z memory 35 and luminance memory 37 are updated in accordance with the comparison results. The above completes the shading process for the second group of pixels, and thereafter, the same operations will be repeated for the third group, fourth group and so on.

When the shading process advances to the last cycle for the last group of pixels, controller 31 discriminates that third pixel P3j is out of the i-th scan line. Then, controller 31 sets control signals 43-0–43-2 at level "1" while setting control signal 43-3 at level "0." Z coordinate generators 30-3–33-3 generate the z-coordinates of pixels P0j-P3j of the last group, and luminance generators 35-0–35-3 generate the luminance values of these pixels P0j-P3j. Comparators 40-0–40-3 output write enable signals representing the comparison results. Since control signals 43-0–43-2 are at level "1," the contents of zeroth to second memory banks 35-0–35-2 and 37-0–37-2 are updated in accordance with the comparison results of comparators 40-0–40-2. Since control signal 43-3 is at level "0," no updation is executed on the contents of third memory banks 35-3 and 37-3. The above completes the shading process for the i-th scan line shown in FIG. 4.

Upon completion of the shading process for the i-th scan line, a shading process for the next scan line designated by yi=yi+1(yij=yij+1) is executed in the above procedures. When the above operations are repeated and shading for the scan line passing point P2 is completed, shading for the lower triangle ($\Delta$P1P2P4) of the triangle shown in FIG. 2 is completed. Then, the upper triangle ($\Delta$P2P3P4) is shaded as per the lower triangle. Through the above operations, the z-coordinates and luminance values of the individual pixels within the triangle ($\Delta$P1P2P3) are updated in memories 35 and 37. This completes the shading process for one triangle, and controller 31 repeats the same process for the next triangle. These operations are repeated for all the triangles for approximating a target three-dimensional object.

The three-dimensional object is displayed as display timing circuit 39 reads out the contents of luminance memory 37 onto CRT monitor 38.

In the above embodiment, X-Y coordinate generator 32 has been explained to generate the x- and y-coordinates of pixels on the i-th scan line. However, generator 32 has only to generate those bits $x'_{ij}$ of the x-coordinate other than the lower two bits. In this case, controller 31 needs to retain the lower two bits of the x-coordinate $x_{il}$ ($= x_{ai}$) of the start pixel.

The above embodiment has been explained with reference to four pixels being simultaneously processed. However, this invention is not limited to this number. With a change in the number of simultaneously-processed pixels, the memory banks of the Z memory and the luminance memory, Z coordinate generators and luminance generators should be increased or decreased.

According to this invention, simultaneous generation and updation of coordinates and luminance values of a plurality of pixels can be performed. That is, simultaneous shading of a plurality of pixels can be executed. Therefore, the image processing apparatus according to this embodiment can provide a high speed three-dimensional display and can practically apply to animation display or the like.

What is claimed is:

1. A three-dimensional display apparatus for approximating a three-dimensional object by means of a set of planes in a three-dimensional space, and approximating each plane by means of a set of scan lines so that a shading process is executed for each scan line, said apparatus comprising:

X-Y coordinate generating means for sequentially generating at least the most significant (m-n) bits of an x-coordinate and a y-coordinate of every $2^n$-th pixel, starting from a pixel at a start point of a target scan line to be shaded (m being a number of bits constituting an x-coordinate, and n being an integer equal to or greater than 1);

$2^n$ Z coordinate generating means for generating, on the target scan line, z-coordinates of consecutive $2^n$ pixels specified by the most significant (m-n) bits of the x-coordinate and the y-coordinate generated by the X-Y coordinate generating means;

Z memory means including $2^n$ Z memory bank means provided in one-to-one correspondence with the $2^n$ Z coordinate generating means, each of the $2^n$ Z memory bank means being coupled to the X-Y coordinate generating means and an associated one of the Z coordinate generating means, for addressing by the most significant (m-n) bits of the x-coordinate and the y-coordinate generated by the X-Y coordinate generating means and for storing a z-coordinate generated by the associated Z coordinate generating means;

$2^n$ luminance generating means for generating luminance values of the consecutive $2^n$ pixels;

luminance memory means including $2^n$ luminance memory bank means provided in one-to-one correspondence with the $2^n$ luminance generating means, each of the $2^n$ luminance memory bank means being coupled to the X-Y coordinate generating means and an associated one of the luminance generating means, for addressing by the most significant (m-n) bits of the x-coordinate and the y-coordinate generated by the X-Y coordinate generating means and for storing a luminance value generated by the associated luminance generating means;

display means for displaying contents of the luminance memory means;

control means, coupled to the X-Y coordinate generating means, the $2^n$ Z coordinate generating means, and the $2^n$ luminance generating means, for setting initial values in the X-Y coordinate generating means, the $2^n$ Z coordinate generating means, and the $2^n$ luminance generating means, for each scan line, and controlling data writing and data writing inhibition of the $2^n$ Z memory bank means and the $2^n$ luminance memory bank means;

$2^n$ comparing means, provided in one-to-one correspondence with the $2^n$ Z coordinate generating means, each of the comparing means being coupled to associated Z coordinate generating means and associated Z memory bank means, for comparing a z-coordinate stored in a region of the associated Z memory bank means specified by the X-Y coordinate generating means, with a z-coordinate generated from the associated Z coordinate generating means; and writing means, coupled to the $2^n$ comparing means and the control means, for selectively setting each of the Z memory bank means and the luminance memory bank means to one of a write-enable state and a write disable state, in response to comparison results of the comparing means and a write instruction from the control means, writing the z-coordinates from the Z coordinate generating means into the Z memory means, when in the write-enable state, and writing the luminance value from the luminance generating means into luminance memory means.

2. The three-dimensional display apparatus according to claim 1, wherein upon reception of z-coordinate of each vertex of each of said planes for object approximation, said Z coordinate generating means acquires z-coordinates of start and end points of said target scan line, by means of interpolation, and acquires and generates z-coordinates of said consecutive $2^n$ pixels on the basis of said z-coordinates of said start and end points, and wherein upon reception of luminance data of each vertex of each of said planes for object approximation, said luminance generating means acquires luminance data of start and end points of said target scan line, by means of interpolation, and acquires and generates luminance data of said consecutive $2^n$ pixels on the basis of said luminance data of said start and end points.

3. The three-dimensional display apparatus according to claim 1, wherein given that $\Delta z$ is a change in a z-coordinate, with an x-coordinate on said target scan line changing by one pixel, each of said $2^n$ Z coordinate generating means changes a z-coordinate by $2^n \cdot \Delta z$ and outputs said z-coordinate in synchronism with generation of x- and y-coordinates from said X-Y coordinate generating means.

4. The three-dimensional display apparatus according to claim 3, wherein given that $\Delta I$ is a change in a luminance value, with an x-coordinate on said target scan line changing by one pixel, each of said $2^n$ luminance generating means changes a luminance value by $2^n \cdot \Delta I$ in synchronism with generation of x- and y-coordinates from said X-Y coordinate generating means.

5. The three-dimensional display apparatus according to claim 4, wherein initial values of z-coordinates from said $2^n$ Z coordinate generating means differ from one another by $\Delta z$ and initial values of luminance values from said $2^n$ luminance generating means differ from one another by $\Delta I$.

6. The three-dimensional display apparatus according to claim 5, wherein at a start of a shading process for said target scan line, said control means sends a write-disable instruction to those of said Z memory bank means which are to store z-coordinates of those pixels of said consecutive $2^n$ pixels, including a pixel at said start point of said target scan line, which are off said target scan line and to those of said luminance memory bank means which are to store luminance values of said pixels off said target scan line.

7. The three-dimensional display apparatus according to claim 6, wherein when a value indicated by the most significant m-n bits of an x-coordinate from said X-Y coordinate generating means coincides with a value indicated by most significant m-n bits of an x-coordinate of a pixel at said end point of said target scan line, said control means discriminates that a shading process for said target scan line has reached a last cycle and sends a write disable instruction to those of said Z memory bank means which are to store z-coordinates of those pixels of said consecutive $2^n$ pixels, including said pixel at said end point of said target scan line, which are off said target scan line and to those of said luminance memory bank means which are to store luminance values of said those pixels off said target scan line.

8. A three-dimensional display apparatus for approximating a three-dimensional object by means of a set of approximate planes ($\Delta P1P2P3$) in a three-dimensional space and expressing each of said approximate planes by means of pixels on a plurality of scan lines, so as to acquire a display image, said apparatus comprising:

designation means for designating, at a given time, a plurality of pixels on a target scan line;

depth data generating means for generating, at the same given time, depth data of pixels designated by said designation means, said depth data defining a depth relationship between the pixels;

luminance data generating means for generating, at the same given time, luminance data of the pixels designated by said designation means, said luminance data defining luminance of said pixels;

depth data storage means for storing said depth data of the pixels;

luminance data storage means for storing said luminance data of the pixels;

comparing means for reading out, from said depth data storage means, said depth data of said plurality of pixels designated by said designation means, receiving depth data of said plurality of pixels generated from said depth data generating means and comparing, at the same given time, said read depth data with said received depth data with respect to a given pixel;

updating means for updating contents of said depth data storage means and said luminance data storage means, in order that said depth data generated by said depth data generating means and said luminance data generated by said luminance data generating means are in accordance with a comparison result of said comparing means, with respect to that pixel whose position as defined by said depth data generated by said depth data generating means is located on a visible side of a position as defined by said depth data read out from said depth data storage means; and display means for displaying contents of said luminance data storage means.

9. A three-dimensional display apparatus for approximating a three-dimensional object by means of a set of approximate planes ($\Delta P1P2P3$) in a three-dimensional space and expressing each of said approximate planes by means of pixels on a plurality of scan lines, so as to acquire a display image, said apparatus comprising:

designation means for designating a plurality of pixels on a target scan line;

depth data generating means for generating depth data of pixels designated by said designation means, said depth data defining a depth relationship between the pixels;

luminance data generating means for generating luminance data of the pixels designated by said designation means, said luminance data defining luminance of said pixels;

depth data storage means for storing said depth data of the pixels;

luminance data storage means for storing said luminance data of the pixels;

comparing means for reading out, from said depth data storage means, said depth data of said plurality of pixels designated by said designation means, receiving depth data of said plurality of pixels generated from said depth data generating means and comparing said read depth data with said received depth data with respect to a given pixel;

updating means for updating contents of said depth data storage means and said luminance data storage means, in order that said depth data generated by said depth data generating means and said luminance data generated by said luminance data generating means are in accordance with a comparison result of said comparing means, with respect to that pixel whose position as defined by said depth data generated by said depth data generating means is located on a visible side of a position as defined by said depth data read out from said depth data storage means; and display means for displaying contents of said luminance data storage means;

wherein said designation means sequentially designates groups each having consecutive $2^n$ pixels on said target scan line;

said depth data generating means generates depth data of each of the $2^n$ pixels of a group designated by said designation means;

said luminance data generating means generates luminance data of each of the $2^n$ pixels of a group designated by said designation means;

said comparing means compares said depth data stored in said depth data storage means with said depth data generated by said depth data generating means, for each of the $2^n$ pixels of a group designated by said designation means; and in accordance with a comparison result of said comparing means, said updating means replaces said depth data and said luminance data of an associated pixel, stored in said depth data storage means and said luminance data storage means, with said depth data generated by said depth data generating means and said luminance data generated by said luminance data generating means, when said depth data generated by said depth data generating means has a higher value than said depth data read out from said depth data storage means, and leaves unchanged data of said associated pixel, stored in said depth data storage means and said luminance data storage means, when said depth data generated by said depth data generating means is equal to or lower in value than said depth data read out from said depth data storage means.

10. The three-dimensional display apparatus according to claim 9, wherein said updating means inhibits said depth data generated from said depth data generating means from being written in said depth data storage means, and inhibits said luminance data generated from said luminance data generating means from being written into said luminance data storage means, irrespective of said comparison result of said comparing means with respect to those pixels of said consecutive $2^n$ pixels of a group, including said pixel at said start point of said target scan line, which are off said target scan line.

11. The three-dimensional display apparatus according to claim 10, wherein said updating means inhibits said depth data generated by said depth data generating means from being written in said depth data storage means, and inhibits said luminance data generated by said luminance data generating means from being written into said luminance data storage means, irrespective of said comparison result of said comparing means with respect to those pixels of said consecutive $2^n$ pixels of a group, including said pixel at said end point of said target scan line, which are off said target scan line.

12. A three-dimensional display apparatus for approximating a three-dimensional object by means of a set of approximate planes ($\Delta P1P2P3$) in a three-dimensional space and expressing each of said approximate planes by means of pixels on a plurality of scan lines, so as to acquire a display image, said apparatus comprising:
   designation means for designating a plurality of pixels on a target scan line;
   depth data generating means for generating depth data of pixels designated by said designation means, said depth data defining a depth relationship between the pixels;
   luminance data generating means for generating luminance data of the pixels designated by said designation means, said luminance data defining luminance of said pixels;
   depth data storage means for storing said depth data of the pixels;
   luminance data storage means for storing said luminance data of the pixels;
   comparing means for reading out, from said depth data storage means, said depth data of said plurality of pixels designated by said designation means, receiving depth data of said plurality of pixels generated from said depth data generating means and comparing said read depth data with said received depth data with respect to a given pixel;
   updating means for updating contents of said depth data storage means and said luminance data storage means, in order that said depth data generated by said depth data generating means and said luminance data generated by said luminance data generating means are in accordance with a comparison result of said comparing means, with respect to that pixel whose position as defined by said depth data generated by said depth data generating means is located on a visible side of a position as defined by said depth data read out from said depth data storage means; and
   display means for displaying contents of said luminance data storage means;
   wherein upon receipt of depth data of each vertex of each of said planes for object approximation, said Z coordinate generating means acquires depth data of start and end points of said target scan line, by means of interpolation, and acquires and generates depth data of consecutive $2^n$ pixels, on the basis of said depth data of said plurality of pixels designated by said designation means, and
   wherein upon reception of luminance data of each vertex of each of said planes for object approximation, said luminance generating means acquires luminance data of start and end points of said target scan line, by means of interpolation, and acquires and generates luminance data of said consecutive $2^n$ pixels, on the basis of said luminance data of said plurality of pixels designated by said designation means.

13. The three-dimensional display apparatus according to claim 12, wherein given that $\Delta z$ is a change in a depth data, with an x-coordinate on said target scan line changing by one pixel, said depth data generating means outputs depth data differing by $2^n \cdot \Delta z$ from the depth data of adjacent pixels.

14. The three-dimensional display apparatus according to claim 13, wherein given that $\Delta I$ is a change in a luminance value, with an x-coordinate on said target scan line changing by one pixel, said luminance data generating means outputs luminance values differing by $2^n \cdot \Delta I$ from the luminance values of adjacent pixels.

* * * * *